US008009971B2

(12) United States Patent
Koo et al.

(10) Patent No.: US 8,009,971 B2
(45) Date of Patent: Aug. 30, 2011

(54) HAND-SHAKE CORRECTION METHOD AND APPARATUS OF CAMERA MODULE FOR USE IN MOBILE DEVICE

(75) Inventors: Jun-Mo Koo, Suwon-si (KR);
Jin-Young Choi, Seoul (KR);
Byung-Kwon Kang, Suwon-si (KR);
Dong-Hoon Jang, Suwon-si (KR);
Pyo-Jae Kim, Seoul (KR); Dong-Sung Song, Seoul (KR); Hyung-Jin Chang, Seoul (KR)

(73) Assignees: Samsung Electronics Co., Ltd., Maetan-Dong, Yeongtong-Gu, Suwon-Si, Gyeonggi-Do (KR); Seoul National University Industry Foundation, Bongcheon-Dong, Gwanak-Gu, Seoul (KR)

( * ) Notice: Subject to any disclaimer, the term of this patent is extended or adjusted under 35 U.S.C. 154(b) by 589 days.

(21) Appl. No.: 11/958,413

(22) Filed: Dec. 18, 2007

(65) Prior Publication Data

US 2008/0152332 A1 Jun. 26, 2008

(30) Foreign Application Priority Data

Dec. 20, 2006 (KR) .................. 10-2006-0130934

(51) Int. Cl.
*G03B 17/00* (2006.01)
*H04N 5/228* (2006.01)
*G05B 13/02* (2006.01)

(52) U.S. Cl. ............................ 396/55; 348/208.4; 700/42

(58) Field of Classification Search ............... 396/52–55; 348/208.99; 700/28, 41–43
See application file for complete search history.

(56) References Cited

U.S. PATENT DOCUMENTS

| 6,944,395 | B2 * | 9/2005 | Hara ......................... 396/52 |
| 2005/0285949 | A1 | 12/2005 | Ogawa et al. |
| 2006/0153554 | A1 * | 7/2006 | Misawa et al. ............ 396/55 |
| 2006/0177209 | A1 * | 8/2006 | Miyasako .................. 396/55 |
| 2006/0285838 | A1 * | 12/2006 | Mashima et al. .......... 396/55 |

FOREIGN PATENT DOCUMENTS

| JP | 09-200608 | 7/1997 |
| JP | 2001-201777 | 7/2001 |

OTHER PUBLICATIONS

Liu, Jun, et al.; "Implementation of a High Performance Multirate Control System Using PC;" PEDS 2003-5th Int'l Conference on Singapore Nov. 17-20, 2003; Piscataway, NJ; vol. 1; XP010694789.
Salt, Julian, et al.; "Multirate Controllers Design by Rate Decomposition;" Decision & Control 2000; Proceedings of the 39$^{th}$ IEEE Conference on Dec. 12-15, 2000; Piscataway, NJ; vol. 5; XP010537228.

* cited by examiner

*Primary Examiner* — W. B. Perkey
*Assistant Examiner* — Minh Q Phan
(74) *Attorney, Agent, or Firm* — Cha & Reiter, LLC (57) ABSTRACT

A hand-shake correction apparatus and method for a camera module for typical use in a mobile device. A camera unit includes an angular velocity sensor for sensing an angular velocity of a hand-shake motion of a camera, a position detection sensor for detecting a current position of an image sensor, and an actuator for actuating the image sensor. An Optical Image Stabilizer (OIS) circuit unit controls the actuator using a multi-rate Proportional Integrate Derivative (PID) control scheme that performs control a plurality of times using a shorter control period compared with existing PID controls for a basic period, in which a reference value is updated according to a control reference value by which the image sensor optimally shifts to correct a hand-shake motion.

16 Claims, 5 Drawing Sheets

FIG.1

FIG.3A      FIG.3B $f_{ctrl}$ : PID CONTROL PERIOD
$f_s$ : EXTERNAL SAMPLING PERIOD
— : ACTUAL CONTROL VALUE
— : DISPLACEMENT BY WHICH ACTUATOR SHOULD SHIFT

HAND-SHAKE CORRECTION METHOD AND APPARATUS OF CAMERA MODULE FOR USE IN MOBILE DEVICE

CLAIM OF PRIORITY

This application claims the benefit of priority under 35 U.S.C. §119(a) from a Korean Patent Application filed in the Korean Intellectual Property Office on Dec. 20, 2006 and assigned Serial No. 2006-130934, the disclosure of which is incorporated herein by reference in its entirety.

BACKGROUND OF THE INVENTION

1. Field of the Invention

The present invention relates generally to a camera module for use in a mobile device. More particularly, the present invention relates to a hand-shake correction method and apparatus for correcting a shake of an image due to occurrence of hands shaking/trembling while holding a camera module during photographing.

2. Description of the Related Art

A conventional camera can provide shake-free high-resolution pictures at a shutter speed of 1/125 second or below, even though the hands of the user tremble somewhat during photographing of images. However, a camera mounted on a mobile device has a reduced quantity of light than the conventional camera during the photographing of images, because the lens aperture is smaller than that of the conventional camera, leaving less of an opportunity for ambient light to be received by the camera aperture. Therefore, the camera mounted on a mobile device uses a slower shutter speed to compensate for the lack of light, and when the camera in a mobile device photographs still images, an image shake may occur, thereby causing a blurred image, even when the degree of hand-shaking is slight due to the slow shutter speed, making it difficult to get the clear pictures. In particular, the problem of image shake due to the shaking hands is more considerable when the amount of ambient less is further reduced, such as in the low-light quantity indoor environment, at night time, or during a cloudy day. In addition, the image shake caused by the shaking hands is considerable even when the focal distance increases due to the use of a zoom function. During the photographing of not only still images but also moving images, a shake of the camera due to the shaking hands of a photographer who is walking or in a moving vehicle causes significant amounts of image blurring.

In order to solve the image-instability problem caused by the hand-shake and/or the shake of the camera-mounted device, there has been a long-felt need in the art for a technique of correcting the image-instability problems cause by shaking hands, and various hand-shake correction schemes have been developed to meet the need. Attempts at addressing this long-felt need include providing apparatuses that correct for the effects of shaking hands during photographing which are generally roughly divided into motion detector and a motion corrector.

With regard to a motion detector, a technique of measuring the motion of a camera-mounted device using a gyro sensor and a technique of detecting a motion of an image in a vector component by image signal processing have been proposed.

With regard to a motion corrector, which uses the motion information detected by the motion detector, the motion corrector corrects images in an optical or electronic manner. The known optical image correction schemes can be classified into a technique of refracting the incident light in an arbitrary direction using an angular-adjustable lens (or active prism), and a technique of returning an image deviated from the optical axis back to its original position by up/down/left/right-shifting a lens or an image sensor such as a Charge Coupled Device (CCD) and a Complementary Metal-Oxide Semiconductor (CMOS), using a piezo-electric device or a Voice Coil Motor (VCM).

The electronic image correction schemes can be generally classified into a technique of controlling an input position of a sensor, and a technique of storing image data in a memory and then controlling an address from which it reads the image data. Typically, the electronic image correction scheme has become popular for use in low-priced camcorders because it is suitable to correct moving images. On the other hand, the optical image correction scheme has become popular for use in high-grade camcorders and cameras because it is capable to correct both moving images and still images.

A method of shifting at least one of a lens, a CCD, or a CMOS image sensor by using a VCM is disclosed in Japanese Patent laid-Open No. 1999-007051, entitled 'Lens Shift Device', invented by Toyoda Yasuhiro, filed on 16 Jun. 1997 by CANON INC, and assigned an application No. 1997-172760.

In manufacturing a camera module for use in a portable mobile device, the size, weight and power consumption are particularly important factors that must be taken into consideration as portability and power consumption, particularly of a mobile terminal or telephone, are significant factors taken into consideration by the purchasers of such devices.

Therefore, consideration regarding size, weight, and power consumption is needed even in designing a hand-shake correction apparatus. Given that power consumption needed for operating an actuator including a lens or image sensor, which has a significant role in a hand-shake correction apparatus, increases with a size and weight of the actuator, there is a need in the art to provide an actuator and a controller that are smaller in size than the conventional components, including the lens or image sensor. Therefore, it is preferable that the hand-shake correction apparatus is modularized in a small size when manufacturing various sensors and other devices. The aforementioned consideration has particular applicability to the future development direction of state of the art mobile devices, in which a mobile phone, an MPEG Audio Layer-3 (MP3), a Portable Multimedia Player (PMP), a digital camera, etc. come out as all-in-one products including multiple functions.

Furthermore, when a conventional hand-shake correction apparatuses are actually miniaturized and implemented for use in mobile devices, the following problems may occur:

First, in realizing a function of measuring a hand-shake from a signal measured by a gyro sensor, errors between an actual signal value and a processed signal value may be accumulated due to offset, drift and phase delay.

Second, a VCM actuator can hardly expect its optimal control performance with the generally used controller, because it has a nonlinear characteristic, a time-varying characteristic in which its dynamic characteristic varies with the passage of time, and a hysteresis characteristic. The actuator including a lens or image sensor may suffer an actuation error that its actuation range decreases step by step due to the friction occurring between surfaces that contact each other during the actuation, even though it has issued an iterative command. Therefore, for the optimal control, there is a need for a controller improved from the existing Proportional Integrate Derivative (PID) controller which has been widely used in configuring a controller. In addition, it should be considered that even though the proposed controller is superior in performance, if there is excessive calculation, its implementation is not easy with the device such as an 8-bit processor generally used for control of miniaturized devices.

Third, because a correction pattern is variable according to users and circumstances, it is not possible to predict a control value for correction, so all calculations should be performed in real time within a very short time.

SUMMARY OF THE INVENTION

The present invention addresses at least some of the problems and/or disadvantages in the art and provides at least the advantages described below. Accordingly, an exemplary aspect of the present invention is to provide a hand-shake correction method and apparatus of a camera module for use in a mobile device that is capable of correcting a hand-shake occurring while photographing an image with a camera module, and is suitable for use in a portable mobile device.

According to one exemplary aspect of the present invention, there is provided a hand-shake correction apparatus of a camera module that is particularly suitable for use in a mobile device. One example of the hand-shake correction apparatus typically includes a camera unit having an angular velocity sensor for sensing an angular velocity of a hand-shake motion of a camera, a position detection sensor for detecting a current position of an image sensor, and an actuator for actuating the image sensor; an Optical Image Stabilizer (OIS) circuit unit for controlling the actuator using a multi-rate Proportional Integrate Derivative (PID) control scheme. The PID performs control several times using a shorter control period when compared with existing PID controls for a basic period, whereby a reference value is updated according to a control reference value by which the image sensor should be shifted to correct a hand-shake motion. Thus, image instability is minimized and/or prevented.

According to another exemplary aspect of the present invention, there is provided a hand-shake correction method of a camera module suitable for use in a mobile device. One example of a hand-shake correction method according to the present invention typically includes detecting an angular velocity of a hand-shake motion that has occurred in a camera, and detecting a position of an image sensor; processing the detected angular velocity signal and image sensor position signal; calculating a degree/amount of hand-shake by integrating the hand-shake angular velocity signal; and controlling the image sensor using a multi-rate Proportional Integrate Derivative (PID) control scheme that performs a control function several times and utilizes a shorter control period compared with existing PID controls.

In particular, according to the present invention, a basic period for the PID control scheme in which a reference value is updated according to a control reference value by which the image sensor should shift to compensate for a hand-shake motion is typically based on the calculated hand-shake and the processed image sensor position signal. This basic period is shorter than known heretofore.

BRIEF DESCRIPTION OF THE DRAWINGS

The above and other exemplary aspects, features and advantages of the present invention will become more apparent from the following detailed description when taken in conjunction with the accompanying drawings in which.

DETAILED DESCRIPTION OF THE INVENTION

Preferred exemplary embodiments of the present invention will now be described in detail with reference to the annexed drawings. For the purposes of clarity and simplicity, a detailed description of known functions and configurations incorporated herein may be omitted so as not to obscure appreciation of the invention by a person of ordinary skill in the art with a description of such known functions and configurations.

Generally, for circuit realization of a controller for hand-shake correction, a technique of configuring a controller using an analog circuit and a technique of configuring a digitalized controller using a Micro Controller Unit (MCU) can be taken into consideration. An analog controller, compared with the digitalized controller, has no need to put up with a loss of control stability due to a signal loss caused by digitalization. However, the present invention typically uses the digitalized controller realized by algorithmizing the controller in a miniaturized microcontroller, taking into account the device miniaturization through circuit miniaturization and the easiness of later technique compensation.

Figure 1:
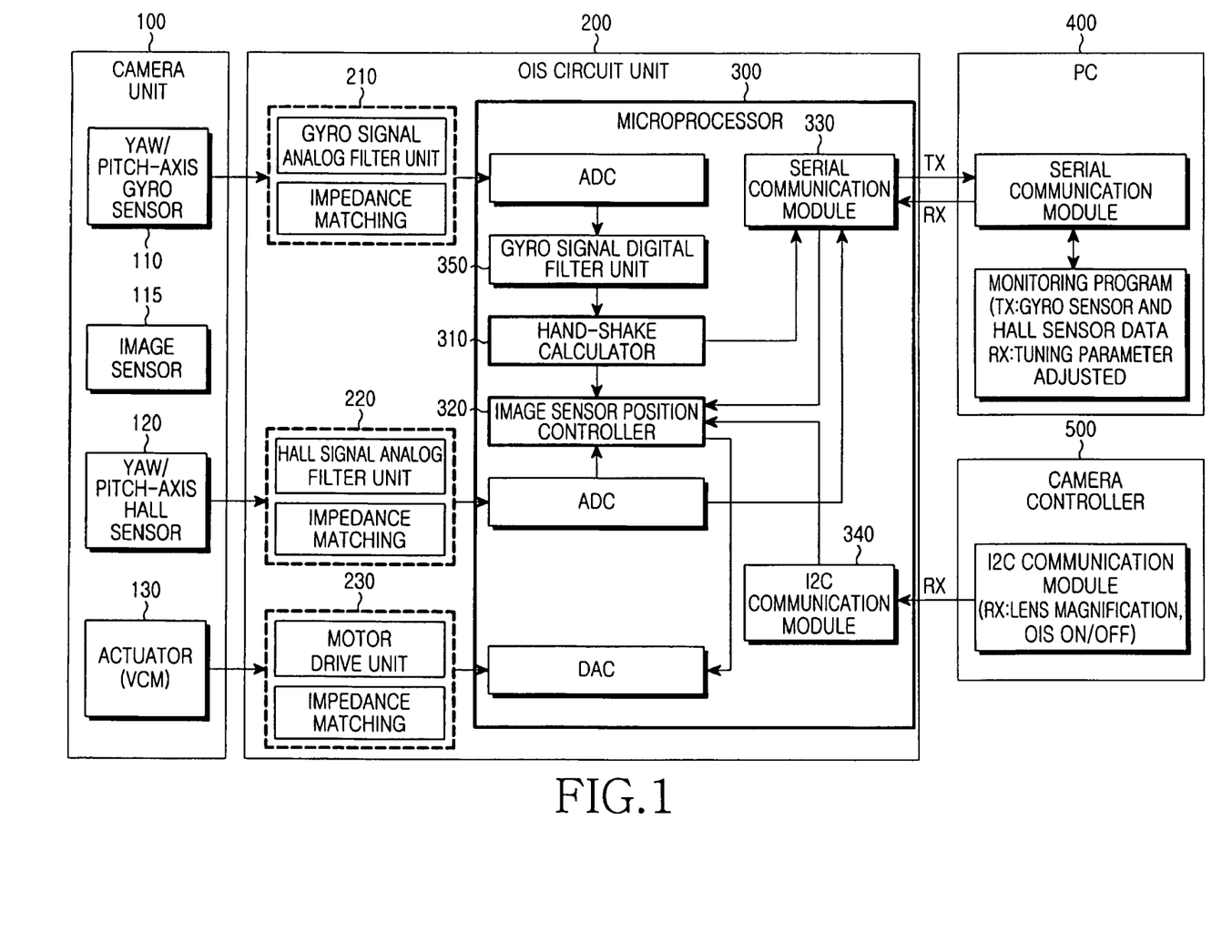
FIG. 1 is a block diagram illustrating a structure of a hand-shake correction apparatus according to an exemplary embodiment of the present invention.

FIG. 1 illustrates a structure of a system having a hand-shake correction apparatus according to an exemplary embodiment of the present invention. Referring to FIG. 1, the hand-shake correction apparatus according to this exemplary embodiment of the present invention includes a camera unit 100 for detecting (capturing) a hand-shake motion of a camera and shifting an image sensor to correct the hand-shake; an Optical Image Stabilizer (OIS) circuit unit 200 for processing signals of the hand-shake motion detected by the camera unit 100 and calculating an estimated shift value for correcting the hand-shake; a Personal Computer (PC) 400 for performing a monitoring operation; and a camera controller 500 for providing the OIS circuit unit 200 with a control value for hand-shake correction.

A detailed description will now be made of elements of the camera unit 100. The camera unit 100 includes a gyro sensor 110 for sensing an angular velocity of a hand-shake motion of a camera in a yaw axis and a pitch axis; a Hall sensor 120 for detecting (capturing) the current position in the yaw axis and pitch axis for the CCD or CMOS image sensor 115 or the lens (hereinafter referred to as 'image sensor' because both are applicable for use in the position detection method); and a actuator 130, made up of a VCM, for shifting (actuating) the image sensor under the control of the controller. The gyro sensor 110 is attached so as to detect an angular velocity of a motion in two directions (for example, one for the yaw axis and one for the pitch axis) in order to compensate for an up/down and left/right hand-shake of the image sensor.

The OIS circuit unit 200 includes an analog filter unit for a gyro signal (hereinafter referred to as a 'gyro signal analog filter unit') 210, made up of a Low Pass Filter (LPF), for filtering off the high-frequency noise component from the motion signal of the camera unit 100 that is detected by the gyro sensor 110, in order to extract only the desired band; an analog filter unit for a Hall signal (hereinafter referred to as a 'Hall signal analog filter unit') 220 for processing a signal for the position of the image sensor, detected by the Hall sensor 120; a microprocessor 300 for calculating a hand-shake using the signals processed by the gyro signal and Hall signal analog filter units 210 and 220, and calculating an estimated shift value by which the image sensor should shift to compensate for the hand-shake; and a motor drive unit 230 for processing an image sensor control value provided from the microprocessor 300 and controlling the VCM of the actuator 130 according to the processed image sensor control value.

The optional PC 400, including a monitoring program, receives monitoring data from the microprocessor 300 using a serial communication scheme, and provides a tuning parameter to the microprocessor 300 after appropriate adjustment. A person of ordinary skill in the art understands and appreciates that the control part for transmission/reception between the PC 400, the monitoring program in the PC 400, and the microprocessor 300 is additionally provided for performance measurement and characteristic detection of the hand-shake correction apparatus for a better effect of the present invention in the development phase of the present invention, and is an unnecessary configuration in the actual user environment of the corresponding hand-shake correction apparatus. Thus, the present invention does not require capability to communicate with a personal computer for tuning/adjustment purposes.

The camera controller 500 typically provides a control signal for controlling a magnification value of the lens and on/off of the OIS circuit unit 200 to the microprocessor 300 via an I-square-C ($I^2C$) communication module 340 using an $I^2C$ communication scheme.

A detailed description will now be made of an example of the microprocessor 300 typically included in the OIS circuit unit 200. The microprocessor 300 includes a digital filter unit for a gyro signal (hereinafter referred to as a 'gyro signal digital filter unit') 350 for filtering off a Direct Current (DC) component from the angular velocity signal of the hand-shake motion detected by the gyro sensor 110 typically using a High Pass Filter (HPF) to extract only the interested signal component considered as a hand-shake; a hand-shake calculator 310 for calculating a hand-shake motion of the camera unit 100 by integrating the angular velocity signal of the hand-shake motion output from the gyro signal digital filter unit 350; a image sensor position controller 320 for calculating a position control value by which the image sensor should shift to correct the hand-shake, using the position information from the image sensor detected by the Hall sensor 120, and the hand-shake value of the camera unit 100, calculated through the hand-shake calculator 310, and then controlling the motor drive unit 230 using the control value; the $I^2C$ communication module 340 for obtaining coefficients necessary for processing the signals through communication with the camera controller 500; and a serial communication module 330 may be included for transmitting/receiving monitoring data for the monitoring program by performing communication with the optional PC 400.

The overall operation of the hand-shake correction apparatus according to an exemplary embodiment of the present invention will now be described in detail with reference to FIG. 1. If a hand-shake motion occurs in the camera unit 100, the gyro sensor 110 measures an angular velocity of the hand-shake motion and provides the measured angular velocity to the gyro signal analog filter unit 210, and the Hall sensor 120 measures position information of the image sensor 115 and provides the position information to the Hall signal analog filter unit 220. The hand-shake signals processed by the filter units 210 and 220 are converted into digital signals. From the converted digital gyro signals, only the necessary components are extracted by the gyro signal digital filter unit 350, and the extracted components are calculated as a hand-shake value by the hand-shake calculator 310. The calculated hand-shake value and the image sensor position information of the converted digital Hall signal are provided to the image sensor position controller 320. The image sensor position controller 320 calculates a control value by which the image sensor should shift for hand-shake correction, using the hand-shake value and the image sensor position information. The control value calculated by the image sensor position controller 320 is converted into an analog signal and then provided to the motor drive unit 230. The motor drive unit 230 shifts the image sensor for hand-shake correction by controlling the VCM in the actuator 130. In this manner, the hand-shake correction apparatus according to an exemplary embodiment of the present invention performs the overall operation.

When the hand-shake motion is measured by the gyro sensor 110, drift or offset of signals due to an external impact or voltage unstableness may occur because of the unique characteristic of the gyro sensor 110. It is thus preferred that the drift or offset should be removed because they are irrelevant to the hand-shake motion. The present invention applies a moving average method to remove the drift or offset.

Figure 2A:
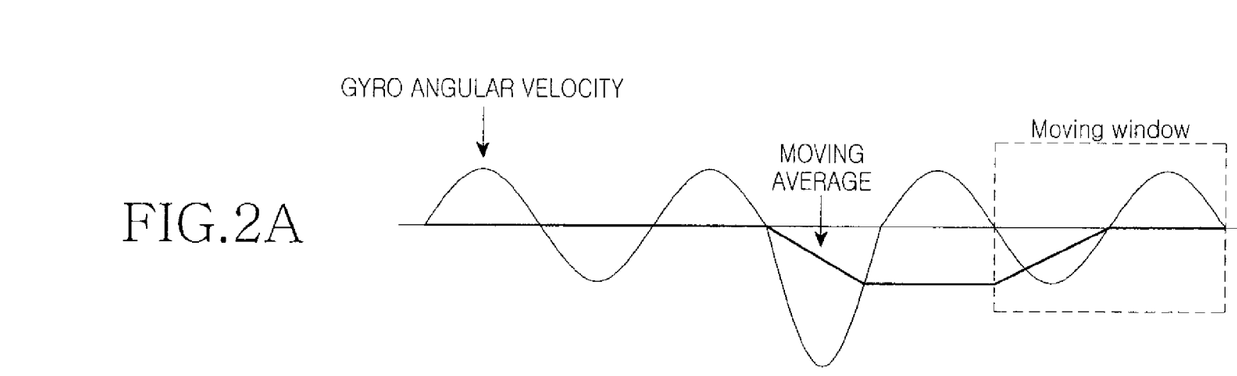
FIGS. 2A to 2C are diagrams illustrating waveforms of a gyro angular velocity to which a moving average method is applied.
Figure 2B:
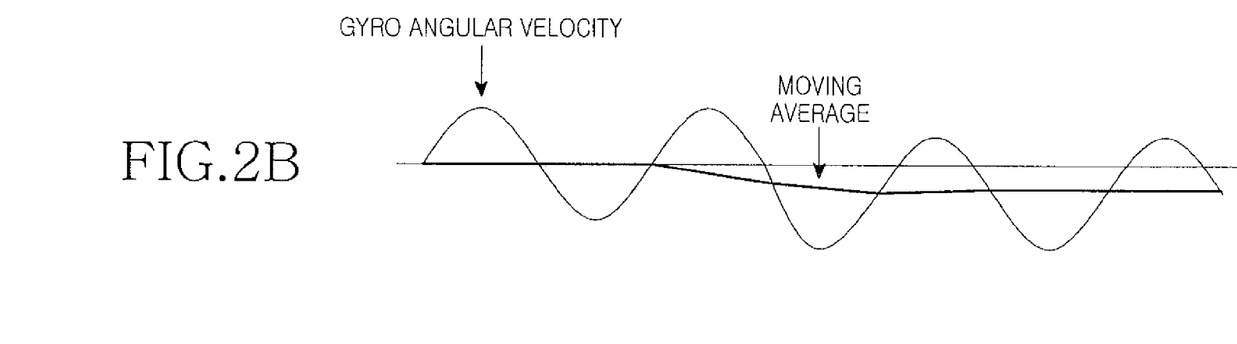
Figure 2C:
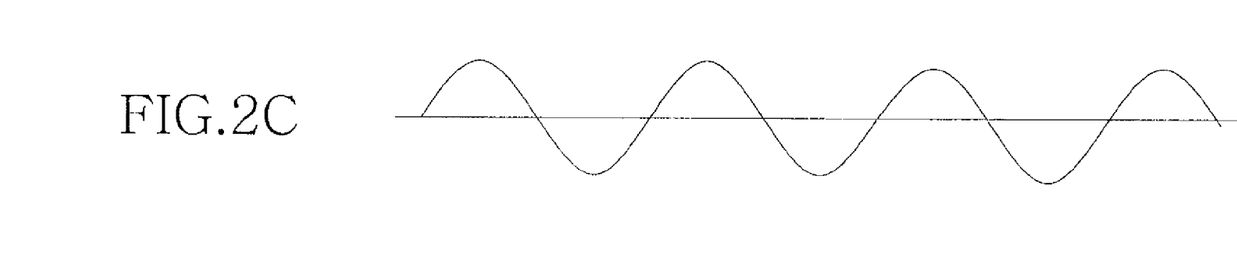

FIGS. 2A to 2C are graphical illustrations of waveforms of a gyro angular velocity to which the moving average method is applied. Specifically, FIG. 2A illustrates a waveform of a gyro angular velocity, showing a moving average of the gyro angular velocity. Referring to FIG. 2A, the moving average method applied to the present invention calculates an average value of gyro angular velocity signals within a specific sampling period beginning from the current time, and substitutes this value for the center value of the current gyro signal, thereby always positioning the center of the hand-shake angular displacement in the zero point. In this manner, with use of the moving average method, it is possible to prevent the offset, which needs no compensation, due to the unique characteristic of the gyro sensor. FIGS. 2B and 2C illustrate waveforms showing a variation in a gyro angular velocity to which the moving average method is applied. FIG. 2B shows a gyro angular velocity before use of the moving average method, and shows an offset that has occurred due to the unique characteristic of the gyro sensor. FIG. 2C illustrates a waveform of a gyro angular velocity to which the moving average method is applied taking into account a moving average in the gyro angular velocity of FIG. 2B.

Thus, according to FIGS. 2A, 2B and 2C, a person of ordinary skill in the art will appreciate that the proposed hand-shake correction apparatus shows better performance by substituting an average value of the gyro angular velocity within a specific sampling period for the center value of the current gyro signal with use of the moving average method in this manner. An angle variation due to the hand-shake calculated using the moving average method is converted into a position displacement by which the image sensor should shift to correct the hand-shake taking a camera zoom ratio into account.

Now referring back to FIG. 1, the image sensor position controller 320 is a part for controlling a motor for shifting the image sensor to compensate for the hand-shake calculated by the hand-shake calculator 310. The controller for controlling the motor is basically based on the PID control method, and is configured by combining several additional methods to achieve the target performance.

The VCD-based actuator 130 has a slight hysteresis because its nonlinearity is very high and it moves using an electromagnet, and every actuator 130 has its unique production deviation. Therefore, the controller performance obtained only through the operation characteristic of the actuator 130 and the PID coefficient tuning has a limit. To solve this problem, the present invention typically uses PID coefficients having a maximum control resolution, and uses a multi-rate PID controller that typically performs control several times using a shorter control period compared with, for example, the conventional PID control for the basic sampling period in which a reference value is updated according to a control reference value by which the image sensor should shift, such that the updated reference value reaches a desired reference value.

Figure 3A:
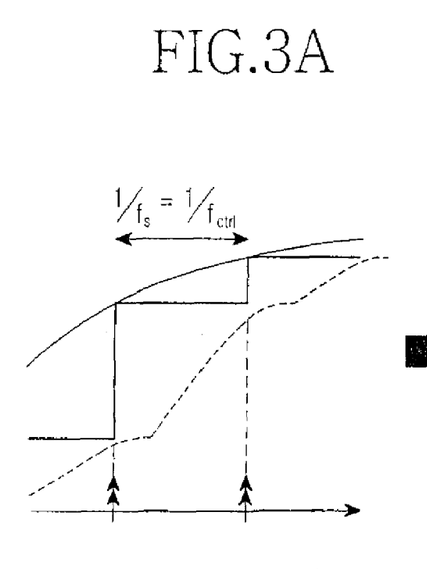
FIGS. 3A and 3B are diagrams illustrating waveforms showing a comparison between a control period of the general PID control and a control period of the multi-rate PID control according to an exemplary embodiment of the present invention.
Figure 3B:
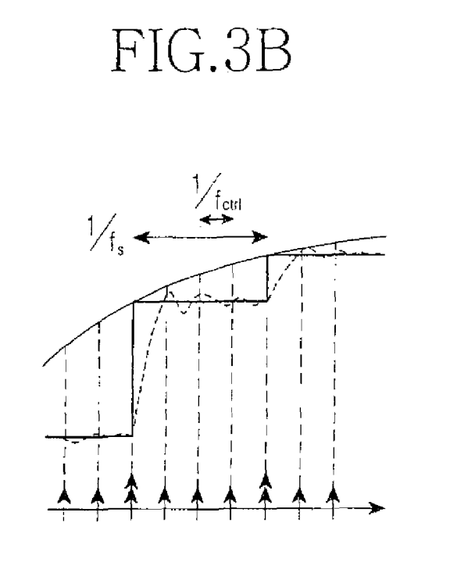

FIGS. 3A and 3B are graphical illustrations of waveforms showing a comparison between a control period of the general PID control and a control period of the multi-rate PID control according to an embodiment of the present invention.

Referring to FIG. 3, $f_{ctrl}$ denotes a PID control period, and $f_s$ denotes an external sampling period. The control period of the general PID control shown in FIG. 3A reaches a desired reference value through one control signal using PID coefficients for which linear operation characteristics of the actuator are taken into account, and the sampling period $f_s$ and the control period $f_{ctrl}$ are equal in their value. On the contrary, the multi-rate PID controller of FIG. 3B performs control several times toward a reference value of the current basic period with the shortest possible control period $f_{ctrl}$ for a basic period $f_s$ in which the reference value is updated, using a PID coefficient having the highest resolution, thereby enabling the control which is robust against the operation characteristic of the actuator or the performance deviation of each individual actuator. Therefore, different multi-rate PID controllers are configured for a sampling period of a gyro sensor signal for calculation of a hand-shake and a feedback sampling period of a Hall sensor signal for control of an image sensor position.

The VCM-based actuator 130 may suffer a phenomenon in which its actuation weakens due to the friction between contact surfaces as time goes by. Because there is a great difference between a static friction and a kinetic friction of the actuator, it is not possible to obtain the constant control performance with the scheme of controlling the actuator in a stationary state every moment.

Therefore, in order to solve the foregoing problems and guarantee the controller performance which is robust against the external powerful impact, the present invention typically configures a new controller designed by adding a pseudo-shake (or pseudo-vibration) scheme to the multi-rate PID controller, such that the new controller outputs a pseudo-shake signal for a predetermined interval of a control signal for controlling the actuator to continuously actuate the actuator so as to control the actuator within a specific kinetic friction. The actuation of the image sensor actuator due to the added pseudo-shake signal can prevent the phenomenon in which the actuation weakens as the image sensor actuator leans toward one direction, and can increase the performance that the controller recovers from the external powerful impact.

Figure 4:
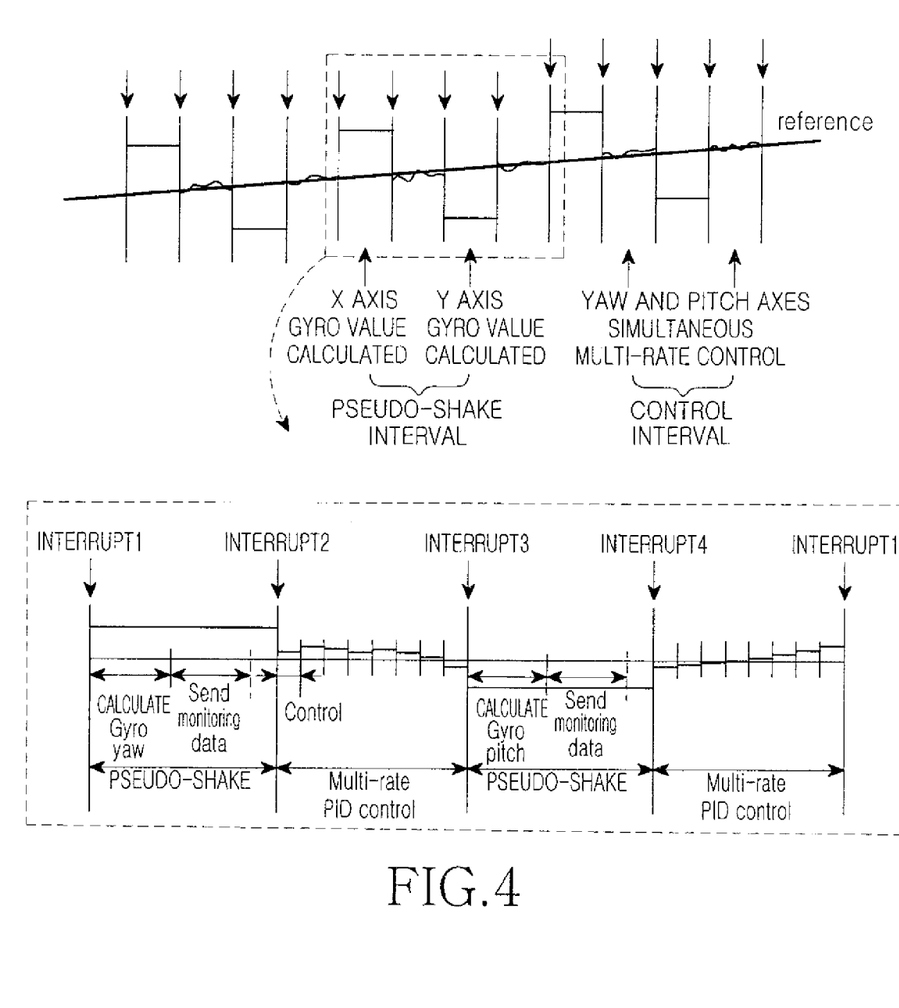
FIG. 4 is a diagram illustrating a waveform showing a hand-shake correction control signal of a hand-shake correction apparatus according to another exemplary embodiment of the present invention.

FIG. 4 illustrates a waveform showing a hand-shake correction control signal of a hand-shake correction apparatus according to an embodiment of the present invention. A displacement value 'reference' of FIG. 4 is a reference value by which the controller should shift the image sensor with the actuator to compensate for a hand-shake motion of the camera. The hand-shake correction apparatus according to an exemplary embodiment of the present invention performs control for hand-shake correction by performing multi-rate PID control depending on the displacement value. Herein, the displacement value by which the actuator should shift exists for each of the yaw axis and the pitch axis, and the hand-shake correction apparatus simultaneously performs control for both axial directions in a control operation for hand-shake correction.

The present invention typically uses a controller that uses a time division scheme to optimally utilize performance of a microprocessor, while providing a pseudo-shake signal through the microprocessor to minimize the number of passive elements so as to contribute miniaturization of the camera module. Referring to FIG. 4, according to the present invention, the controller typically generates an interrupt using a control signal for hand-shake correction at regular intervals in such a manner that 4 interrupt intervals have different functions performed therein, thereby using 4 interrupts as one interval that follows one reference value. With use of the new controller, the present invention can distribute the calculation necessary for control, and secure the optimal control performance through multi-rate PID control mixed of the pseudo-shake scheme and the time division scheme.

Figure 5:
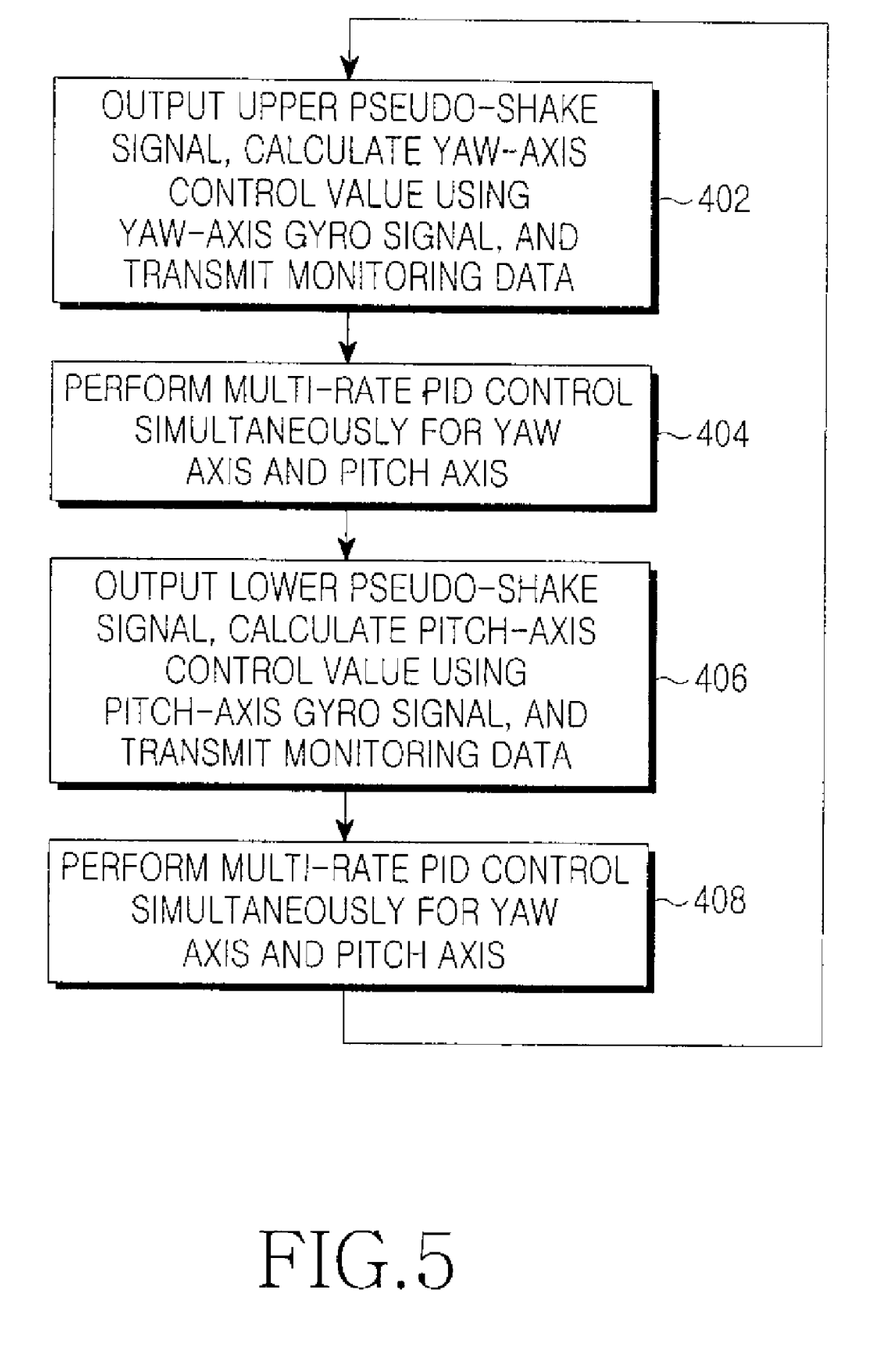
FIG. 5 is a flowchart illustrating a control operation for one control period of a hand-shake correction apparatus according to another exemplary embodiment of the present invention.

A detailed description will now be made of the time division scheme with reference to FIG. 5. FIG. 5 is a flowchart illustrating a control operation for one control period of a hand-shake correction apparatus according to an exemplary embodiment of the present invention. With reference to FIG. 5, a control operation performed in each individual interrupt interval will now be described in detail.

Referring to FIG. 5, in step 402 (first interrupt), the hand-shake correction apparatus outputs an upper pseudo-shake signal with a value sufficiently greater than the common PID control value to secure performance of the controller even at the external powerful impact, calculates a yaw-axis control value using a yaw-axis gyro signal, and transmits the resulting signal to a monitoring program.

In step 404 (second interrupt), the hand-shake correction apparatus performs control simultaneously for both the yaw axis and the pitch axis using a multi-rate PID controller. Herein, for the yaw axis, the hand-shake correction apparatus performs control using the value calculated in step 402, and for the pitch axis, the hand-shake correction apparatus performs control using the value calculated in step 406 of the previous interval.

In step 406 (third interrupt), the hand-shake correction apparatus outputs a lower pseudo-shake signal with a value sufficiently greater than the common PID control value like in step 402, calculates a pitch-axis control value using a pitch-axis gyro signal, and transmits the resulting signal to the monitoring program.

In step 408 (fourth interrupt), the hand-shake correction apparatus re-performs control simultaneously for both the yaw axis and the pitch axis using the multi-rate PID controller. For the yaw axis, the hand-shake correction apparatus performs control using the intact value calculated in step 402, and for the pitch axis, the hand-shake correction apparatus performs control using the value calculated in step 406. The control scheme of the hand-shake correction apparatus according to an exemplary embodiment of the present invention, a control scheme mixed of the pseudo-shake scheme and the time division scheme for multi-rate PID control, performs an operation for correcting a hand-shake by repeatedly executing the 4 steps of step 402 to step 408 as one criterion.

As is apparent from the foregoing description, the hand-shake correction method and apparatus of a camera module for use in a mobile device according to the present invention controls a position of the image sensor according to the quantity and direction of a hand-shake when photographing an image through the camera module so as to allow the image to be formed in the same position of the image sensor, thereby enabling photographing of a high-quality image and thus increasing user satisfaction for the product. In addition, compared with the existing similar apparatus, the novel apparatus can be modularized in a small size, facilitating its application to small mobile devices.

While the invention has been shown and described with reference to a certain preferred embodiment thereof, it will be understood by those skilled in the art that various changes in form and details may be made therein without departing from the spirit of the invention and the scope of the appended claims. For example, while the present invention is suitable for use in mobile devices such as cellphones, PDA's, etc., the invention is not limited to such an intended use, and has varied applicability, for example, inside or on a vehicle (which may be an auto, train, bicycle, etc.) on a boat, while flying, when attached to a person or an article of clothing, etc. where the environment may introduce shaking in lieu of or in addition to hand tremors.

Also, while the image sensor position controller calculates the amount the image sensor 115 should shift, this may be an optimal value, and the actual amount of shift could be subject to limitations/wear of the components, or the shift value could be so large that the actual shift is different than the optimal amount determined by the controller. Finally, the gyro sensor does not need to be attached to the camera module. It is however, preferred to attach the gyro sensor to the camera unit in order to minimize detection errors of the sensor. Moreover, the sensor may be attached to, for example, the mobile phone case or substrate in the state of detaching the camera unit within a tolerance and strongly fixed.

What is claimed is:

1. A hand-shake correction apparatus of a camera module for use in a mobile device, the apparatus comprising:
    a camera unit including an angular velocity sensor for sensing an angular velocity of a hand-shake motion of a camera,
    a position detection sensor for detecting a position of an image sensor, and
    an actuator for actuating the image sensor; and
    an Optical Image Stabilizer (OIS) circuit unit for controlling the actuator using a multi-rate Proportional Integrate Derivative (PID) control scheme that performs control for a plurality of times over a basic period in which a reference value is updated according to a control reference value by which the image sensor optimally shifts to correct a hand-shake motion, the control scheme comprising a time-division scheme wherein different functions are performed in each subdivision of the time-division scheme.

2. The hand-shake correction apparatus of claim 1, wherein the angular velocity sensor is attached to the camera unit for detecting an angular velocity of a motion in two directions in order to compensate for an up/down and left/right hand-shake of the image sensor.

3. The hand-shake correction apparatus of claim 2, wherein the two directions comprise a yaw axis and a pitch axis.

4. The hand-shake correction apparatus of claim 2, wherein the angular velocity sensor comprises a gyro sensor.

5. The hand-shake correction apparatus of claim 4, wherein the position detection sensor comprises a Hall sensor.

6. The hand-shake correction apparatus of claim 1, wherein the angular velocity sensor comprises a gyro sensor.

7. The hand-shake correction apparatus of claim 1, wherein the position detection sensor comprises a Hall sensor.

8. The hand-shake correction apparatus of claim 1, wherein the actuator comprises a Voice Coil Motor (VCM) in shifting the image sensor.

9. The hand-shake correction apparatus of claim 1, wherein the OIS circuit unit comprises:
    a gyro signal analog filter unit including a Low Pass Filter (LPF) for filtering off a high-frequency noise component from a hand-shake motion signal to extract a desired band;
    a Hall signal analog filter unit for processing a signal for the position of the image sensor detected by the Hall sensor;
    a motor drive unit for controlling a motor of the actuator; and
    a microprocessor for calculating a control value by which the image sensor is shifted to compensate for a hand-shake, and for controlling the motor drive unit depending on the control value.

10. The hand-shake correction apparatus of claim 9, wherein the microprocessor comprises:
    a gyro signal digital filter unit for filtering off a Direct Current (DC) component from the angular velocity signal of the hand-shake motion using a High Pass Filter (HPF);
    a hand-shake calculator for calculating a hand-shake of the camera unit by integrating the angular velocity signal of the hand-shake motion; and
    a image sensor position controller for calculating a control value by which the image sensor shifts to compensate for a hand-shake motion, and controlling the motor drive unit depending on the control value.

11. A hand-shake correction method of a camera module for use in a mobile device, the method comprising:
    (a) detecting an angular velocity of a hand-shake motion that has occurred in a camera, and detecting a position of an image sensor of the camera;
    (b) generating an angular velocity signal and an image sensor signal, respectively, in accordance with step (a)
    (c) processing the detected angular velocity signal and image sensor position signal generated in step (b);
    (d) calculating a hand-shake by integrating the angular velocity signal; and
    (e) controlling the image sensor using a multi-rate Proportional Integrate Derivative (PID) control scheme that performs control for a plurality of times in a time-division scheme over a basic period in which a reference value is updated according to a control reference value by which the image sensor optimally shifts in order to compensate for a hand-shake motion, based on the calculated hand-shake and the processed image sensor position signal,
    wherein a different function is performed in each of the plurality of times.

12. The hand-shake correction method of claim 11, wherein the calculation of a hand-shake comprises:
    applying a moving average method that calculates an average value of gyro angular velocity signals within a specific sampling period beginning from a current time, and substitutes the calculated average value for a center value of a current gyro signal thereby positioning a center of a hand-shake angular displacement in a zero point.

13. The hand-shake correction method of claim 11, wherein a control scheme for controlling the image sensor in order to compensate for a hand-shake motion includes a pseudo-shake scheme added thereto, which outputs a pseudo-shake signal to an actuator for a predetermined interval of a control signal to continuously actuate the actuator thereby controlling the image sensor within a specific kinetic friction.

14. The hand-shake correction method of claim 13, wherein a the time division scheme, which generates an interrupt at regular intervals using a control signal, and performs a different operation in each of a predetermined number of interrupt intervals using the plurality of interrupts as one interval.

15. The hand-shake correction method of claim 14, wherein the time division scheme outputs a pseudo-shake signal, calculates a gyro signal for a yaw axis, and transmits a resulting signal to a monitoring program in a first interrupt interval out of four predetermined interrupt intervals;
    performs multi-rate PID control simultaneously for two directions of the yaw axis and a pitch axis in a second interrupt interval;
    outputs a pseudo-shake signal, calculates a gyro signal of the pitch axis, and transmits a resulting signal to the monitoring program in a third interrupt interval; and
    performs multi-rate PID control simultaneously for two directions of the yaw axis and the pitch axis in a fourth interrupt interval.

16. The method according to claim 11, wherein in step (e) the optimal shift and an actual shift of the image sensor are substantially equal.

* * * * *